US009187608B2

(12) United States Patent  
Loh et al.

(10) Patent No.: US 9,187,608 B2
(45) Date of Patent: Nov. 17, 2015

(54) POLYSTYRENE FOAM CONTAINING A MODIFIER-FREE NANOCLAY AND HAVING IMPROVED FIRE PROTECTION PERFORMANCE

(75) Inventors: Roland R. Loh, Stow, OH (US); Mark E. Polasky, Mogadore, OH (US); Yadollah Delaviz, Lewis Center, OH (US); L. James Lee, Columbus, OH (US); Xia Cao, Arlington, MA (US); Jiong Shen, Columbus, OH (US); Bharat Patel, Dublin, OH (US)

(73) Assignee: Owens Corning Intellectual Capital, LLC, Toldo, OH (US)

( * ) Notice: Subject to any disclaimer, the term of this patent is extended or adjusted under 35 U.S.C. 154(b) by 1578 days.

(21) Appl. No.: 11/221,522

(22) Filed: Sep. 8, 2005

(65) Prior Publication Data

US 2007/0179205 A1    Aug. 2, 2007

(51) Int. Cl.
| | |
|---|---|
| C08J 9/18 | (2006.01) |
| C08J 9/20 | (2006.01) |
| C08J 9/00 | (2006.01) |
| C08J 9/232 | (2006.01) |

(52) U.S. Cl.
CPC ............... *C08J 9/0066* (2013.01); *C08J 9/008* (2013.01); *C08J 9/20* (2013.01); *C08J 9/232* (2013.01); *C08J 2201/03* (2013.01); *C08J 2203/14* (2013.01); *C08J 2325/06* (2013.01)

(58) Field of Classification Search
CPC ..................................... C08J 9/18; C08J 9/20
USPC ................................................. 521/56, 83, 86
See application file for complete search history.

(56) References Cited

U.S. PATENT DOCUMENTS

| | | | |
|---|---|---|---|
| 2,365,086 | A | 12/1944 | Kamowski |
| 3,574,644 | A | 4/1971 | Olstowski et al. |
| 3,627,480 | A | 12/1971 | Birchall |
| 3,673,290 | A | 6/1972 | Brubaker et al. |
| 4,301,040 | A | 11/1981 | Berbeco |
| 4,385,156 | A * | 5/1983 | Ingram et al. ............... 525/253 |
| 4,394,460 | A | 7/1983 | Chung et al. |
| 4,692,381 | A | 9/1987 | Pecsok |
| 4,996,109 | A | 2/1991 | Krieg et al. |
| 5,010,112 | A | 4/1991 | Glicksman et al. |
| 5,130,342 | A | 7/1992 | McAllister et al. |
| 5,234,967 | A | 8/1993 | Takezawa et al. |
| 5,366,675 | A | 11/1994 | Needham |
| 5,369,135 | A | 11/1994 | Campbell et al. |
| 5,550,170 | A * | 8/1996 | Trager et al. ............... 521/143 |
| 5,679,718 | A | 10/1997 | Suh et al. |
| 5,710,186 | A | 1/1998 | Chaudhary |
| 5,719,199 | A | 2/1998 | Wallace et al. |
| 5,779,775 | A | 7/1998 | Kuwabara et al. |
| 5,853,752 | A | 12/1998 | Unger et al. |
| 5,854,295 | A | 12/1998 | Suh et al. |
| 5,912,279 | A | 6/1999 | Hammel et al. |
| 5,977,197 | A | 11/1999 | Malone |
| 5,993,707 | A | 11/1999 | Chaudhary et al. |
| 6,048,909 | A | 4/2000 | Chaudhary et al. |
| 6,093,752 | A | 7/2000 | Park et al. |
| 6,123,881 | A | 9/2000 | Miller et al. |
| 6,130,265 | A | 10/2000 | Glueck et al. |
| 6,133,333 | A | 10/2000 | Chaudhary et al. |
| 6,174,471 | B1 | 1/2001 | Park et al. |
| 6,197,233 | B1 | 3/2001 | Mason et al. |
| 6,213,540 | B1 | 4/2001 | Tusim et al. |
| 6,231,795 | B1 | 5/2001 | Chaudhary et al. |
| 6,242,540 | B1 * | 6/2001 | Crevecoeur et al. ............ 526/73 |
| 6,340,713 | B1 | 1/2002 | Gluck et al. |
| 6,350,789 | B1 | 2/2002 | Miller et al. |
| 6,355,341 | B1 | 3/2002 | Chaudhary et al. |
| 6,362,242 | B1 | 3/2002 | Gluck et al. |
| 6,387,968 | B1 | 5/2002 | Gluck et al. |

(Continued)

FOREIGN PATENT DOCUMENTS

| | | |
|---|---|---|
| DE | 199 07 663 | 8/2000 |
| DE | 199 10 257 | 9/2000 |

(Continued)

OTHER PUBLICATIONS

Zeng et al Polymer/Clay Nanocomposite Foams Preapred by CO2. 2003 ANTEC Conference; pp. 1732-1736.

(Continued)

*Primary Examiner* — Megan McCulley  
(74) *Attorney, Agent, or Firm* — Calfee, Halter & Griswold LLP

(57) ABSTRACT

Polymer extruded or expanded foams that contain modifier-free nanoclays are provided. The addition of modifier-free nano-clays to extruded or expanded foam products improves the thermal properties, mechanical properties, and fire performance properties. Water or a water-containing compound is used as a carrier for the modifier-free nanoclays. The final foamed products may be utilized in building application such as foamed insulation products and in underground applications such as highway insulation. A preferred modifier-free nanoclay is $Na^+MMT$. Modifier-free nanoclay particles may be injected into a polymer during an extrusion foaming process. In another embodiment of the invention, polymer beads containing water/nanoclay particles are formed using inverse emulsion/suspension polymerizations and expanded or extruded into a foamed product. In a further embodiment, a modifier-free nanoclay particle is encapsulated in a super-absorbent material, which may be used in an expanding or extruding process.

7 Claims, 7 Drawing Sheets

(56) References Cited

U.S. PATENT DOCUMENTS

| | | | |
|---|---|---|---|
| 6,395,795 B1 | 5/2002 | Hrivnak | |
| 6,417,240 B1 | 7/2002 | Park | |
| 6,420,442 B1 | 7/2002 | Dietzen et al. | |
| 6,518,324 B1 * | 2/2003 | Kresta et al. | 521/83 |
| 6,521,672 B1 | 2/2003 | Gluck et al. | |
| 6,589,646 B1 | 7/2003 | Morgenstern | |
| 6,617,295 B2 | 9/2003 | Nitzsche | |
| 6,696,504 B1 | 2/2004 | Hayashi et al. | |
| 6,699,454 B1 | 3/2004 | Moy et al. | |
| 6,759,446 B2 | 7/2004 | Lee et al. | |
| 6,815,491 B2 | 11/2004 | Adedeji et al. | |
| 6,818,163 B1 | 11/2004 | Fibiger et al. | |
| 6,844,055 B1 | 1/2005 | Grinshpun et al. | |
| 6,908,950 B2 | 6/2005 | Loh et al. | |
| 7,160,929 B1 | 1/2007 | Tan | |
| 7,169,467 B2 * | 1/2007 | Wilson | 428/317.9 |
| 2001/0036970 A1 | 11/2001 | Park | |
| 2002/0006976 A1 | 1/2002 | Subramonian et al. | |
| 2002/0022672 A1 | 2/2002 | Thunhorst et al. | |
| 2002/0041955 A1 | 4/2002 | Watanabe et al. | |
| 2002/0086908 A1 * | 7/2002 | Chou et al. | 516/98 |
| 2002/0121717 A1 | 9/2002 | Chaudhary et al. | |
| 2002/0155270 A1 | 10/2002 | Chaudhary et al. | |
| 2002/0168509 A1 | 11/2002 | De Simone et al. | |
| 2003/0082343 A1 | 5/2003 | Brucker | |
| 2003/0130364 A1 * | 7/2003 | Vo et al. | 521/82 |
| 2003/0162852 A1 | 8/2003 | Chaudhary et al. | |
| 2003/0175497 A1 | 9/2003 | Kobe et al. | |
| 2003/0205832 A1 | 11/2003 | Lee et al. | |
| 2004/0167240 A1 | 8/2004 | Burgun et al. | |
| 2004/0209782 A1 | 10/2004 | Zhang et al. | |
| 2004/0234443 A1 | 11/2004 | Chen et al. | |
| 2005/0004243 A1 * | 1/2005 | Lee et al. | 521/82 |
| 2005/0027040 A1 | 2/2005 | Nelson et al. | |
| 2005/0048276 A1 | 3/2005 | Wilson | |
| 2005/0112356 A1 | 5/2005 | Rynd et al. | |
| 2006/0148916 A1 | 7/2006 | Loh et al. | |
| 2007/0269647 A1 * | 11/2007 | Wu et al. | 428/317.9 |
| 2008/0067709 A1 * | 3/2008 | Galewski et al. | 264/53 |

FOREIGN PATENT DOCUMENTS

| | | | |
|---|---|---|---|
| DE | 2004 019708 | 11/2005 | |
| EP | 0515125 | 11/1992 | |
| EP | 620 246 | 10/1994 | |
| EP | 0 729 999 | 4/1996 | |
| EP | 0 863 175 | 9/1998 | |
| EP | 0921148 | 2/2000 | |
| EP | 1024163 | 8/2000 | |
| EP | 0675918 | 9/2000 | |
| EP | 97/02457 | 10/2000 | |
| EP | 1 205 437 | 5/2002 | |
| EP | 99/04867 | 5/2002 | |
| EP | 1209189 | 5/2002 | |
| EP | 0922554 | 6/2003 | |
| EP | 01214372 | 12/2005 | |
| WO | WO 97/31053 | 8/1997 | |
| WO | WO 98/03581 | 1/1998 | |
| WO | WO 99/31170 | 6/1999 | |
| WO | WO 99/47592 | 9/1999 | |
| WO | WO 00/34363 | 6/2000 | |
| WO | WO 00/34365 | 6/2000 | |
| WO | WO 01/40362 | 6/2001 | |
| WO | WO 01/39954 | 7/2001 | |
| WO | WO 03/055804 | 7/2003 | |
| WO | WO 2004-003063 | 1/2004 | |
| WO | WO 2004/065461 | 8/2004 | |
| WO | WO 2004/067577 | 8/2004 | |
| WO | WO 2004/078785 | * 9/2004 | |
| WO | WO 2005/054349 | 6/2005 | |
| WO | WO 2006/009945 | 1/2006 | |
| WO | WO 2006/009980 | 1/2006 | |
| WO | WO 2006/073712 | 7/2006 | |
| WO | WO 2008/005022 | 1/2008 | |

OTHER PUBLICATIONS

Han et al "Extrusion of Polystyrene Foams Reinforced With Nano-Clays". 2003 ANTEC Conference; pp. 1635-1639.
International Search Report PCT/US2008/058543 dated Jul. 23, 2008.
International Search Report PCT/US2005/045291 dated May 12, 2006.
Zhang, et al., Preparation and Combustion Properties of Flame Retardant SBA Copolymer/Graphite Oxide Nanocomposites, Marcromol, Mater Eng., Mar. 2004, 289, 355-59.
Cassegneau, et al., Preparation and Characterization of Ultrathin Films Layer-by-Layer Self Assembled from graphite Oxide Nanoplatelets and Polymer, Langmuir, 2000, 16, 7318-24.
Guo-Hua Chen, Da-Jun Wu, Wen-Gui Weng and Wen-Li Yan; Dispersion of Graphite Nanosheets in a Polymer Matrix and the Conducting Property of the Nanocomposites; Polymer Engineering and Science, Dec. 2001, vol. 41, No. 12; pp. 2148-2154.
Pan, Y.X., Yu, Z.Z, Ou, Y.C., Hu, G.H.; A new process of fabracating electrically conducting nylon 6/graphite nanocomposites via intercalation polymerization, Journal of Polymer Science: Part B: Polymer Physics, 38, 1626-1633 (2000).
Xiao, P., Xiao, M., Gong, K.; Preparation of exfoliated graphite/polystyrene composite by polymerization-filling technique, Polymer, 42, 4813-4816 (2001).
Chen, G.H., Wu, D.J., Weng, W.G., Yan, Wi., Preparation of polymer/graphite conducting nanocomposite by intercalation polymerization, Journal of Applied Polymer Science, 82, 2506-2513 (2001).
Uhl, F.M. and Wilkie, C.A., Polystyrene/graphite nanocomposites: effect on thermal stability, Polymer Degradation and Stability, 76, 111-122 (2002).
Modesti, M., Lorenzetti, A., Simioni, F., Camino, G., Expandable graphite as an intumescent flame retardant in polyisocyanurate-polyurethane forms, Polymer Degradation and Stability, 77, 195-202 (2002).
Drzal, L.T. and Fukushima, H., Graphite nanoplatelets as reinforcements for polymers, Polymers Preprints (American Chemical Society, Division of Polymer Chemistry) 42 (2), 42-43 (2001).
US communication dated Feb. 23, 2007 for U.S. Appl. No. 11/026,011.
Applicant's submission dated Mar. 26, 2007 for U.S. Appl. No. 11/026,011.
US communication dated May 17, 2007 for U.S. Appl. No. 11/026,011.
Applicant's submission dated Sep. 10, 2007 for U.S. Appl. No. 11/026,011.
US communication dated Nov. 28, 2007 for U.S. Appl. No. 11/026,011.
Applicant's submission dated Apr. 28, 2008 for U.S. Appl. No. 11/026,011.
US communication dated Jul. 31, 2008 for U.S. Appl. No. 11/026,011.
Applicant's submission dated Nov. 21, 2008 for U.S. Appl. No. 11/026,011.
US communication dated Feb. 4, 2009 for U.S. Appl. No. 11/026,011.
Applicant's submission dated May 4, 2009 for U.S. Appl. No. 11/026,011.
US communication dated May 8, 2009 for U.S. Appl. No. 11/026,011.
Applicant's submission dated May 19, 2009 for U.S. Appl. No. 11/026,011.
US communication dated Aug. 18, 2009 for U.S. Appl. No. 11/026,011.
US communication dated Sep. 10, 2009 for U.S. Appl. No. 11/729,157.
Applicant's submission Feb. 1, 2010 for U.S. Appl. No. 11/729,157.
US communication dated Jul. 25, 2005 for U.S. Appl. No. 10/722,929.
Applicant's submission dated Oct. 25, 2005 for U.S. Appl. No. 10/722,929.
US communication dated Jan. 25, 2006 for U.S. Appl. No. 10/722,929.

(56) References Cited

OTHER PUBLICATIONS

Applicant's submission dated Apr. 25, 2006 for U.S. Appl. No. 10/722,929.
US communication dated Jun. 8, 2006 for U.S. Appl. No. 10/722,929.
Applicant's submission dated Sep. 8, 2006 for U.S. Appl. No. 10/722,929.
US communication dated Nov. 30, 2006 for U.S. Appl. No. 10/722,929.
Applicant's submission dated Feb. 26, 2007 for U.S. Appl. No. 10/722,929.
US communication dated Mar. 16, 2007 for U.S. Appl. No. 10/722,929.
Applicant's submission dated Apr. 5, 2007 for U.S. Appl. No. 10/722,929.
US communication dated Jul. 3, 2007 for U.S. Appl. No. 10/722,929.
Applicant's submission dated Oct. 3, 2007 for U.S. Appl. No. 10/722,929.
US communication dated Dec. 26, 2007 for U.S. Appl. No. 10/722,929.
Applicant's submission dated Mar. 12, 2008 for U.S. Appl. No. 10/722,929.
US communication dated Mar. 26, 2008 for U.S. Appl. No. 10/722,929.
Applicant's submission dated Apr. 28, 2008 for U.S. Appl. No. 10/722,929.
US communication dated Jun. 12, 2008 for U.S. Appl. No. 10/722,929.
Applicant's submission dated Sep. 5, 2008 for U.S. Appl. No. 10/722,929.
US communication dated Nov. 20, 2008 for U.S. Appl. No. 10/722,929.
Applicant's submission dated Jan. 16, 2009 for U.S. Appl. No. 10/722,929.
US communication dated Jan. 29, 2009 for U.S. Appl. No. 10/722,929.
Applicant's submission dated Feb. 16, 2009 for U.S. Appl. No. 10/722,929.
US communication dated Mar. 12, 2009 for U.S. Appl. No. 10/722,929.
Applicant's submission dated Mar. 27, 2009 for U.S. Appl. No. 10/722,929.
US communication dated Mar. 27, 2009 for U.S. Appl. No. 10/722,929.
Applicant's submission dated May 29, 2009 for U.S. Appl. No. 10/722,929.
US communication dated Aug. 4, 2009 for U.S. Appl. No. 10/722,929.
Applicant's submission dated Sep. 25, 2009 for U.S. Appl. No. 10/722,929.
US communication dated Nov. 19, 2009 for U.S. Appl. No. 10/722,929.
Applicant's submission dated Dec. 1, 2009 for U.S. Appl. No. 10/722,929.
US communication dated Jan. 6, 2010 for U.S. Appl. No. 10/722,929.
Applicant's submission dated Mar. 19, 2010 for U.S. Appl. No. 10/722,929.
US communication dated Mar. 30, 2010 for U.S. Appl. No. 10/722,929.

* cited by examiner

200 μm

200 μm

200 μm

200 μm

POLYSTYRENE FOAM CONTAINING A MODIFIER-FREE NANOCLAY AND HAVING IMPROVED FIRE PROTECTION PERFORMANCE

REFERENCE TO GOVERNMENT RIGHTS

This invention was made with Government support under Advanced Technology Program (ATP) Grant No. 70NANB2H3023 awarded by the National Institute of Standards and Technology (NIST). The Government may have certain rights to this invention.

TECHNICAL FIELD AND INDUSTRIAL APPLICABILITY OF THE INVENTION

The present invention relates generally to polymer foams containing a nanoclay, and more particularly, to polymer foams containing a modifier-free nanoclay that provides improved fire resistance. Methods of forming such modifier-free nanoclay polymer foams are also provided.

BACKGROUND OF THE INVENTION

Foamed resinous structures are useful in a wide variety of applications such as thermal insulation, in cushions, as packaging, and as adsorbents. Extruded foams are generally made by melting a polymer together with any desired additives to create a polymer melt. A blowing agent is mixed with the polymer melt at an appropriate temperature and pressure to produce a foamable gel mixture. The foamable gel mixture is then cooled and extruded into a zone of reduced pressure, which results in a foaming of the gel and the formation of the desired extruded foam product.

Nanoclays have been used to modify cellular foams in both batch and continuous extrusion foaming processes. It has been discovered that the addition of nanoclays into the polymer matrix of cellular foams results in an improvement in physical properties, such as improvements in mechanical strength (tensile modulus and strength and flexural modulus and strength), thermal stability, flame retardance, and barrier resistance. Three polymer/clay structures are possible: agglomerated nano-particles, intercalated nano-layers, and exfoliated nano-layers. In general, the greatest physical property enhancements, such as reducing the gas permeability, increasing the modulus, and/or increasing the thermal stability, are observed from nano-layers that are fully exfoliated throughout the polymer matrix.

Although nanoclays have a high aspect ratio, they require special treatment to separate the nano-layers and achieve exfoliation. One such manner of achieving exfoliated nano-layers is to incorporate an organic modifier in the clay. Layered nano-materials, such as organo-montmorillonite, typically contain approximately 30-40 wt % of low molecular weight organic modifiers. These modifiers are used to convert the clay surface from hydrophilic to hydrophobic, and to make the clay particles compatible with the polymer matrix for dispersion. Previous attempts to form an intercalated or exfoliated microstructure of a nanoclay-polymer matrix/composite have utilized modifiers such as methacryloyloxy-ethylhexadecyl-dimethyl ammoniums and methyl tallow bis-2-hydroxyethyl quaternary ammonia salts (e.g., Closite 20A, commercially available from Southern Clay Products Inc.). Although polymer nanoclay composite foams containing such modifiers have demonstrated promising fire retardant properties in terms of reduced heat release, smoke release rate, and char forming during firing, these surface modifiers are considered fire hazards based on industry fire tests, such as oxygen index and flame surface spread rates.

Therefore, there exists a need in the art to achieve an extruded or expanded polymer foam that contains a uniform clay dispersion in the polymer matrix that maintains the positive physical properties of nanoclay foam composites and meets the stringent requirements for industrial fire resistance applications.

SUMMARY OF THE INVENTION

It is an object of the present invention to provide expandable polymer beads that may be used to form insulation products such as foamed building and underground insulation products. The polymer beads are generally spherical and contain multiple water/nanoclay particles suspended in an emulsified water phase. The water/nanoclay particles are substantially uniformly distributed within the polymer matrix. The particular polymer utilized to form the polymer beads is preferably selected to provide sufficient mechanical strength to avoid rupture as a result of mechanical stress during formation of the bead, inclusion into the polymeric foam, and the processes utilized to form final polymer products. The polymer material is also preferably chemically stable within the expected temperature range during formation and subsequent use in a polymeric foam. Suitable examples include polystyrene, melamine formaldehyde, polyurethane, polymethyleneurea, polyester, polyethylene, polypropylene, polyethylene terephthalate, polycarbonate, polyamide, polyvinyl chloride, and polyvinyl alcohol. The nanoclay forming the water/nanoclay particles is preferably a modifier-free nanoclay, such as $Na^+MMT$ or $Ca^{2+}MMT$. The polymer beads containing the water/nanoclay particles may be formed into a foam by an expanding process in which the polymer beads are expanded in a mold having a desired shape. The polymer beads may be expanded such by hot air, hot oil, supersaturated water steam, or microwave heating. The addition of nanoclay improves thermal and mechanical properties as well fire performance properties of the foam products. In addition, the modifier-free nanoclays reduce the burning characteristics of polymer foams such as melting and dripping and assists in the increase formation of char, which helps to meet stringent fire requirements.

It is also an object of the present invention to provide a method of forming expandable polymer beads that may be used to form insulation products such as foamed building and underground insulation products. In one exemplary embodiment of the invention, the polymer beads described above are formed using inverse emulsion/suspension polymerizations. Water or water-containing compounds such as water/surfactant(s), water/alcohol(s), and water/polymer(s) may be used as a carrier to form the nanoclay composites. Preferably, the carrier is water. Initially, the modifier-free nanoclay is dispersed in water such as by mechanical stirring to form a water/clay mixture. The nanoclay may be further moistened and pre-expanded by microwave heating, steaming, or frozen/vacuum treating before dispersing the modifier-free nanoclay into the water carrier. The water/clay mixture may then be emulsified in a pre-polymerized styrene/polystyrene system with the aid of non-flammable surfactants to form a water-in-oil (w/o) inverse emulsion. The non-flammable surfactants may be present in an amount from 0.1 to 3% by weight of styrene/polystyrene to stabilize the water/clay mixture. The inverse emulsion may be suspended in water (suspension water) in the presence of suspension stabilizers that can be removed after the completion of the polymerization. The suspension is then cooled to room (ambient) temperature and the spherical polystyrene beads containing the water/modifier-free nanoclay particles may be recovered by conventional rinsing and filtration techniques.

It is a further object of the present invention to provide a method of forming insulation products such as foamed building and underground insulation products utilizing a modifier-free nanoclay encapsulated in a superabsorbent material. A modifier-free nanoclay such as $Na^+MMT$ or $Ca^{2+}MMT$ is dispersed in a carrier and agitated to form a carrier/nanoclay mixture. The carrier is preferably water, or a water-containing compound such as water/surfactant(s), water/alcohol(s), and water/polymer(s). Most preferably, the carrier is water. The carrier/nanoclay mixture is encapsulated in a superabsorbent material to form a modifier-free, nanoclay-containing compound that may be used in an extrusion or expansion foaming process. Examples of superabsorbent materials include crosslinked sodium polyacrylates and fine inorganic chemicals such as fumed or precipitated silica, zeolite, carbon black, zeolite, and diatomaceous earth. An extruded foam product may be prepared by any method known to those of skill in the art such as with an extruder (twin or single), a mixer, or a blender.

It is an advantage of the present invention that the absence of surface modifiers on the nanoclay increases the resistance of foam products formed from such modifier-free nanoclays to fire, such as by reducing the flame spread and dripping and increasing oxygen index and char formation.

It is another advantage of the present invention that the increased blowing power of water over conventional blowing agents produces a foam with bi-modal cell morphology, which may enhance the R-value of the insulation.

It is also an advantage of the present invention that the modifier-free nanoclay polymer compounds have intercalated or exfoliated nano-layers that lead to an improvement of physical properties such as barrier resistance, mechanical strength, and flexural and tensile modulus.

It is yet another advantage of the present invention that water is used as a carrier and as a co-blowing agent. Water provides a low-cost, environmentally friendly alternative to conventional hydrocarbon blowing agents.

It is a further advantage of the present invention that the weaker interaction between the clay and the polymer matrix without clay surface modification may facilitate the orientation of the clay and improve physical properties such as barrier resistance, thermal stability, mechanical strength, and wear resistance.

It is also an advantage of the present invention that the dispersion of the nanoclay in water increases safety and reduces human health concerns because the nanoclay is compounded directly into monomer or polymer.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION AND PREFERRED EMBODIMENTS OF THE INVENTION

Figure 1:
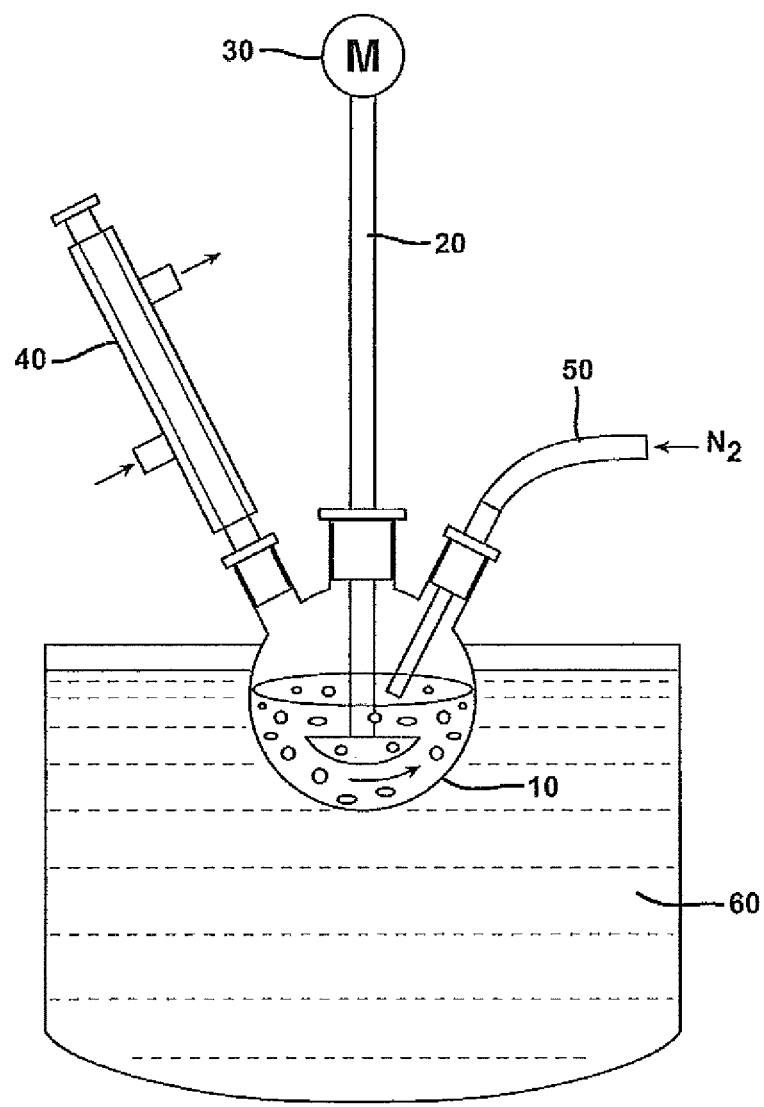
FIG. 1 is a schematic illustration of a polymerization reactor used in accordance with at least one embodiment of the present invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, or any other references, are each incorporated by reference in their entireties, including all data, tables, figures, and text presented in the cited references. In the drawings, the thickness of the lines, layers, and regions may be exaggerated for clarity. It is to be noted that like numbers found throughout the figures denote like elements.

The present invention relates to polymer extruded or expanded foams that contain modifier-free nanoclays and methods of making such polymer foams. The foams may be formed into an insulation product such as building insulation or underground insulation (e.g., highway, airport runway, railway, and underground utility insulation). In the present invention, water or a water-containing compound is used as a medium and a carrier for the modifier-free nanoclays. The addition of nano-materials to the foams improves thermal and mechanical properties as well fire performance properties. In addition, the modifier-free nanoclays assist in improving fire performance properties such as char formation, increasing the oxygen index, and decreasing the flame spread, which helps to meet stringent fire requirements.

In one exemplary embodiment of the invention, polymer beads containing myriads of water/nanoclay particles (droplets) are formed using inverse emulsion/suspension polymerizations. Water or water-containing compounds such as water/surfactant(s), water/alcohol(s), and water/polymer(s)

may be used as a carrier to form the nanoclay composites of the present invention. Water is preferably used as a carrier to reduce or eliminate the fire hazards of conventional modified nanoclays. It is desirable that the water is distilled water, and even more desirable that the water is deionized water. Water may also be used as a blowing or co-blowing agent in forming an expanded or extruded polystyrene foam. There are several advantages to utilizing water as a co-blowing agent to produce low density foams. For example, water is an effective and environmentally friendly low-cost co-blowing agent. It is non-flammable and does not produce volatile organic carbon (VOC) hydrocarbons. In addition, the high enthalpy of vaporization allows water to function as a coolant during the foaming process. Further, the increased blowing power of water over conventional blowing agents produces a foam with bi-modal cell morphology, which, in turn, may enhance the insulation R-value.

Modifier-free nanoclays used in the present invention are not particularly limited and include modifier-free nanoclays such as sodium montmorillonite ($Na^+MMT$), and calcium montmorillonite ($Ca^{2+}MMT$), which can be synthetic or natural. Although calcium montmorillonite typically exists as aggregates formed of layered structures, the aggregates can be exfoliated in a water-based solution. It is to be appreciated that layered talc minerals may be included in addition to, or in place of, the modifier-free nanoclays, and such embodiments are considered to be within the purview of this invention. In preferred embodiments, the nanoclay is $Na^+MMT$, which is commercially available from Southern Clay Products, Inc.

The polymer material utilized in forming the polymer beads according to the present invention include one or more polymeric materials such as polystyrene (PS), melamine formaldehyde (MF), polyurethane (PU), polymethyleneurea, polyester, polyethylene (PE), polypropylene (PP), polyethylene terephthalate (PET), polycarbonate (PC), polyamide (PA), polyvinyl chloride (PVC), and polyvinyl alcohol (PVA). The particular polymer material may be selected to provide sufficient mechanical strength to avoid rupture as a result of mechanical stress during formation, inclusion into the polymeric foam, and the processes utilized to form final polymer products. The polymer material is also preferably chemically stable, i.e., generally non-reactive, within the expected temperature range during formation and subsequent use in a polymeric foam. In a preferred embodiment, the polymer material is polystyrene.

It is to be noted that although any of the carriers (e.g., water) or polymers (e.g., polystyrene) identified above may be used to form the carrier/nanoclay containing polymer beads, the embodiments will be described herein with respect to the preferred carrier, water, and the preferred polymer, polystyrene. The modifier-free nanoclay is dispersed in water such as by mechanical stirring. Optionally, the modifier-free nanoclay may be further moistened and pre-expanded by microwave heating, steaming, or frozen/vacuum treating before dispersing the modifier-free nanoclay into the water carrier. A substantially uniform dispersion of water and clay may be achieved due to the hydrophilic clay surface. As used herein, the term "substantially uniform dispersion of water and clay" is meant to indicate that the clay is uniformly dispersed in the carrier (e.g., water) or that the clay is nearly uniformly dispersed in the carrier (e.g., water).

The water/clay mixture may then be emulsified in a prepolymerized styrene/polystyrene system with the aid of non-flammable surfactants to form a water-in-oil (w/o) inverse emulsion. It is to be appreciated that the water/clay mixture may be emulsified in other types of polymers such as epoxy, phenolic, and polymethyl methacrylate (PMMA) as long as the monomer does not react with the water (i.e., carrier) during synthesis of the polystyrene beads. The non-flammable surfactants may be present in an amount from 0.1 to 3% by weight of styrene/polystyrene to stabilize the water/clay mixture. Suitable surfactants include amphiphillic surfactants such as bis(2-ethylhexyl) sulfosuccinate (AOT, commercially available from Sigma-Aldrich Corp.), sorbitan monooleate (SPAN 80, commercially available from Sigma-Aldrich Corp.), sorbitan monostearate (SPAN 60, commercially available from Sigma-Aldrich Corp.), non-ionic surfactants, anionic surfactants, and any non-flammable water-in-oil (w/o) emulsifier. It is preferred that the surfactants be certified as non-flammable according to the Hazardous Materials Identification System (HMIS) and/or the National Fire Protection Association (NFPA).

The inverse emulsion may be suspended in water (suspension water) in the presence of suspension stabilizers that can be removed after the completion of the polymerization. Preferably, the suspension water is distilled water, and even more preferably deionized water. Other suitable suspension stabilizers include, but are not limited to hydroxyethylcellulose (HEC), polyvinyl alcohol (PVA), polyvinyl-pyrrolidone, salts of acrylic acid polymers, cellulose ethers, agarose, and natural gums that may be combined with an anionic emulsifier, and combinations thereof. The suspension stabilizers may be present in the inverse emulsion in an amount of approximately 0.1-5% by weight based on the suspension water, preferably in an amount of about 1-1.5% by weight based on the suspension water. The suspension is cooled to room (ambient) temperature and the spherical polystyrene beads containing the water/modifier-free nanoclay particles may be recovered by conventional rinsing and filtration techniques. The polystyrene beads may have a clay content up to 15% by weight based on the styrene/polystyrene, preferably a clay content of about 1-15% by weight based on the styrene/polystyrene, and more preferably a clay content of about 0.1-5% by weight based on the styrene/polystyrene.

The polymer beads contain a uniform or substantially uniform distribution of water/modifier-free nanoclay particles within a polymer matrix (e.g., styrene/polystyrene system). The polymer beads are generally spherical in shape and have diameters of about 0.01-5 mm. The polymer beads containing the nanoclay may be formed into a foam by an expanding process in which the polymer beads containing the water/nanoclay particles are expanded such as by hot air, hot oil, supersaturated water steam, or microwave heating in a mold having a desired shape. The incorporation of the nanoclay in the polymer beads may result in an increased expansion ratio and final foam structures with bi-modal cell morphology. The final foam structures are preferably utilized in building applications such as building insulations for masonry cavity-walls, tilt-up walls, roofing, exterior walls, and under floor slabs and in underground applications such as highway insulation, airport runway insulation, railway insulation, and underground utility insulation. Further, the nanoclay polymer compounds provide intercalated or exfoliated nano-layers. The intercalated or exfoliated layers may lead to an improvement or enhancement of physical properties such as barrier resistance, mechanical strength, and flexural and tensile modulus.

The polymer beads containing the water/nanoclay droplets may also be used in an extrusion process described below to form polymeric insulative foam products such as those described herein. For example, if the nanoclay/water containing polymer beads are added to a polymer matrix, the polymer beads may be co-foamed by using blowing agents such as pentane, $N_2$, $CO_2$, HCFC, HFC, or HC into final extruded foam products. The nanoclay/water containing polymer beads may expand after the extrusion process.

In a second embodiment of the invention, a modifier-free nanoclay is encapsulated in a super-absorbent material which can then be used in an expanding or extruding process to form a foam product. Any one (or more) of the modifier-free nanoclays described above is dispersed in a carrier, preferably water, with agitation, such as by mechanical stirring, to form a uniform or substantially uniform mixture of the carrier and the modifier-free nanoclay. The carrier/nanoclay mixture may be encapsulated in a super-absorbant material to form a modifier-free, nanoclay-containing compound suitable for extrusion or expansion foaming process. Non-limiting examples of super-absorbant materials include crosslinked sodium polyacrylates such as LiquiBlock 2G-10 (available from ETI), Alcosperse 747-D, 729-D, and 724-D (available from Alco Chemical), Stockhansen SAB 800 fine (available from Allied Colloid), and fine inorganic chemicals such as fumed or precipitated silica (Cab-O-Sil M-5P and Aerosil-200 available from Cabot), zeolite, carbon black (Black Pearls 2000 available from Cabot), zeolite, and diatomaceous earth.

As one example, the modifier-free, nanoclay-containing compound may be used for extrusion into foam products. The extruded foam product may be prepared by any method known to those of skill in the art such as with an extruder (twin or single), a mixer, or a blender. The encapsulated modifier-free, nanoclay, along with any optional polymers and/or additives, are heated to a first temperature sufficient to melt the polymer(s) (i.e., the melt mixing temperature) and mixed to form a melted nanoclay/polymer mixture. A blowing agent may be added to the nanoclay/polymer mixture under a first pressure and under conditions that permit a thorough mixing of the blowing agent and nanoclay/polymer mixture while preventing foaming of the mixture. A variety of blowing agents such as HCFC, HFC, $CO_2$, $H_2O$, inert gases, and hydrocarbons may be used, either singly or in combination. Once the blowing agent is incorporated and thoroughly mixed with the nanoclay/polymer mixture, the resulting composition is typically referred to as a foamable gel. The foamable gel is then cooled to a second temperature (i.e., the die melt temperature), and is extruded into a zone of reduced pressure (a second pressure) resulting in foaming of the gel and formation of the desired extruded foam product. The nanoclay may behave as a surfactant to stabilize the growth of the bubbles at the interface of gas and polymer during the foaming process.

Alternatively, the encapsulated modifier-free nanoclay may be formed into a foam by an expanding process in which the encapsulated emulsified water/modifier-free nanoclay is expanded such as by hot air, hot oil, supersaturated water steam, or microwave heating in a mold having a desired shape.

Non-limiting optional additives that may be incorporated into the extruded foam product include plasticizers, flame retardant chemicals, pigments, elastomers, extrusion aids, antioxidants, fillers, antistatic agents, cell size enlargement agents, and/or UV absorbers.

In a third embodiment of the invention, the modifier-free nanoclay is directly injected into the polymer during an extrusion foaming process such as is described above. In this embodiment, an injection line for the carrier (e.g., water) separate from the injection line for the blowing agent and polymer matrix may be added on the extrusion line. A separate pump (e.g., a syringe pump) may be utilized to control the amount of the nanoclay/carrier injected into the extruder during foaming. As with the embodiments described above, the nanoclay and carrier may be any one or more of the nanoclays and carriers described herein.

This process by directly injecting the nanoclay/carrier suspensions into the extrusion foaming line shortens the residence time of clay in the extruder and thus reduces the chances for re-aggregation of the clay. Well-dispersed clay without re-aggregation demonstrates high nucleation ability and product properties such as barrier resistance, mechanical strength, and flexural and tensile modulus. This direct injection method also reduces or eliminates any potential water loss by evaporation. As a result, an accurate metering can be obtained, which improves foam quality.

There are numerous advantages of utilizing modifier-free nanoclays to form foam products. For instance, without a surface modification on the nanoclay, the synthesis of the polymer/clay nanocomposite (e.g., polymer beads or encapsulated nanoclay) is simplified, which reduces the manufacturing costs and increases the speed of the production lines. For example, conventional modified clays contain a specific modifier that limits the surfactants and emulsifiers that may be utilized. On the other hand, in the present invention, a more extensive list of surfactants and emulsifiers may be used to form the polymer/clay nanocomposite and thus the foamed product. In addition, by not surface-modifying the clay as in the present invention, more nanoclay can be added to the polymer beads and the clay and the polymer are directly interphased.

Additionally, the dispersion of the nanoclay in water increases safety and reduces human health concerns because the fluffy nanoclay is either compounded directly into monomer or polymer. In addition, modifier-free nanoclays may act as a nucleation agent for non-polar foaming agents, such as water or ethanol. The weaker interaction between the clay and polymer matrix without clay surface modification may facilitate the orientation of clay, and thus improve the corresponding properties such as barrier resistance, thermal stability, mechanical strength, and wear resistance. Further, the absence of surface modifiers on the nanoclay increases the resistance of foam products formed from the modifier-free nanoclays to fire, such as by reducing the flame spread and dripping.

Having generally described this invention, a further understanding can be obtained by reference to certain specific examples illustrated below which are provided for purposes of illustration only and are not intended to be all inclusive or limiting unless otherwise specified.

EXAMPLES

Example 1

Synthesis of Water-Containing Polystyrene Nanoclay Composites Via Inverse Emulsion/Suspension Polymerization The polymerization experiments were performed in a 1000 ml three-neck round flask 10 fitted with an impeller stirrer 20 propelled by a motor 30, reflux condenser 40, and nitrogen inlet 50 as shown in FIG. 1. The flask 10 was positioned in a warm water bath 60. Styrene with dissolved 2,2'-azobis (isobutyronitrile) (AIBN), benzoyl peroxide (BPO), and bis (2-ethylhexyl) sulfosuccinate (AOT) in an amount of 10% by weight based on the emulsified water was stirred at 350 rpm at 90° C. under a nitrogen blanket to form a pre-polymerized styrene/polystyrene system.

Figure 2A:
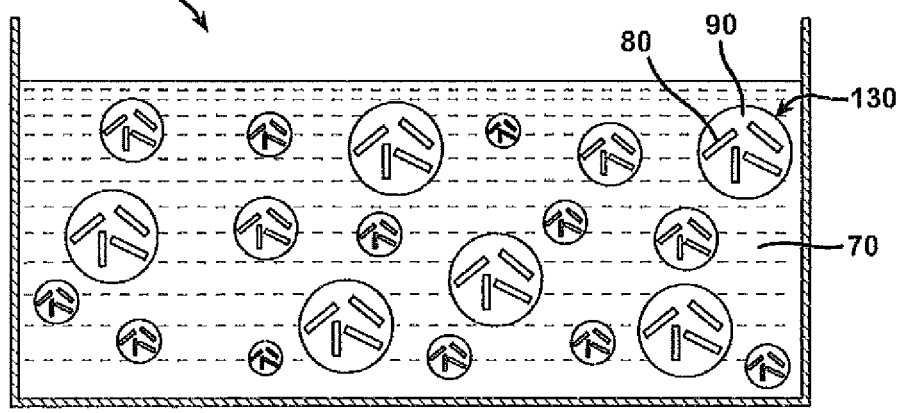
FIG. 2a is a schematic depiction of an emulsification of water in a styrene/polystyrene mixture.

The synthesis reaction was performed in bulk with a conversion of approximately 60% (determined by offline DSC). A water/NaCl mixture for preparing polystyrene beads containing emulsified water/NaCl (control) or a water/clay ($Na^+$MMT)/NaCl mixture for preparing the polymer beads containing myriads of water/nanoclay particles (droplets) having a final clay content of 0.5-1.5% by weight of styrene/polystyrene was added to the pre-polymerized styrene/polystyrene system and emulsified by stirring the resulting mixture at 700 rpm for five minutes. A schematic illustration of the emulsification of the water in the styrene/polystyrene system with the water/clay ($Na^+$MMT)/NaCl mixture is illustrated in FIG. 2a. As depicted in FIG. 2a, the inverse emulsion 100 contained nanoclay/water particles 130 suspended in the styrene/polystyrene system 70. The nanoclay/water particles were formed of nanoclay ($Na^+$MMT) 80 suspended in an emulsified water phase 90.

Figure 2B:
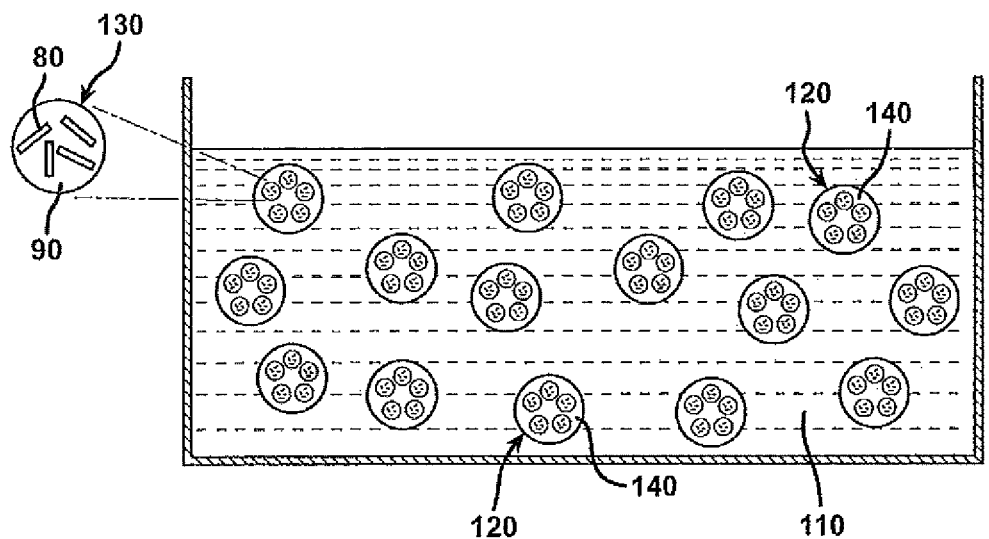
FIG. 2b is a schematic depiction of a suspension polymerization of styrene/polystyrene droplets.

Subsequently, 100 g of the viscous inverse emulsion 100 was then suspended in water (suspension water, 300 g), with the aid of suspension stabilizers hydroxyethylcellulose (HEC) and polyvinyl alcohol (PVA) in an amount of 0.6% (HEC) and 0.005% (PVA). Polymerization was continued for five hours under a nitrogen atmosphere. The stirring rate and the temperature were maintained at 350 rpm and 90° C., respectively. Finally, the suspension was cooled to room temperature and spherical products were recovered by rinsing and filtration. A schematic illustration of the suspension polymerization of the styrene/polystyrene droplets containing emulsified water is depicted in FIG. 2b. As shown in FIG. 2b, the suspension water 110 contained polystyrene beads 120 having therein the water/nanoclay particles 130 ($Na^+$MMT 80 suspended in the emulsified water phase 90). The water/nanoclay particles 130 were suspended in a styrene/polystyrene mixture 140.

The recovered beads with and without $Na^+$MMT were expanded utilizing two different heating mediums: hot air and hot oil bath. The heating temperature was 135° C. in both cases. After exposure to the hot medium for one minute, the expanded beads were quenched by compressed cold air (in the hot air method) or by an ice-water mixture (in the hot oil bath method). The morphology of both the compact (i.e., before expansion) and the expanded beads was examined by a scanning electron microscope (SEM, HITATCHI S-4300), operated at 15 KV. Samples were freeze-fractured in liquid nitrogen and the fracture surface was sputter-coated with gold.

Figure 3A:
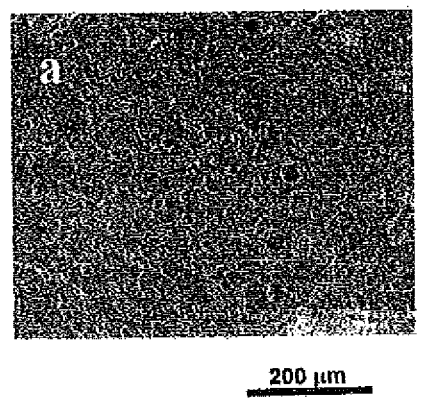
FIG. 3a is a scanning electron microscope (SEM) image of compacted microscopic water-containing polystyrene beads (10% $H_2O$)
Figure 3B:
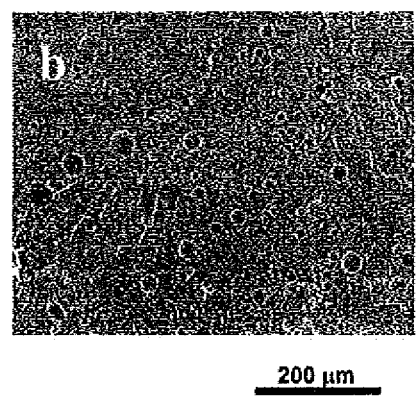
FIG. 3b is a scanning electron microscope (SEM) image of compacted microscopic beads containing nanoclay and water (0.5 wt. % nanoclay, 10% $H_2O$)
Figure 4A:
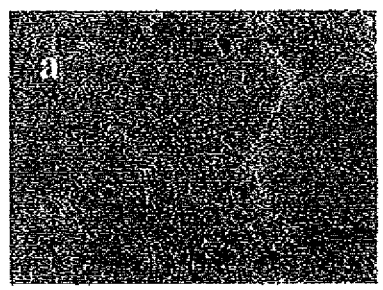
FIG. 4a is a scanning electron microscope image (SEM) of the foam morphology of microscopic water-containing beads (10% $H_2O$) expanded with an air gun (135° C., 1 min.)
Figure 4B:
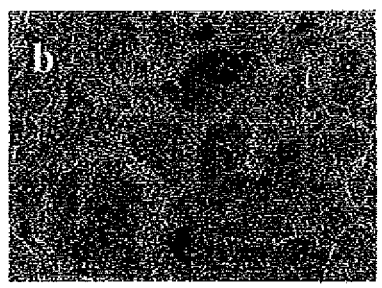
FIG. 4b is a scanning electron microscope (SEM) image of the foam morphology of microscopic water-containing beads (10% $H_2O$) expanded with an oil bath (135° C., 1 min.)
Figure 4C:
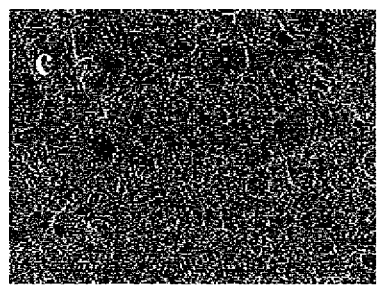
FIG. 4c is a scanning electron microscope (SEM) image of the foam morphology of microscopic beads containing nanoclay (0.5 wt. % nanoclay, 10% $H_2O$) expanded with an air gun (135° C., 1 min.)
Figure 4D:
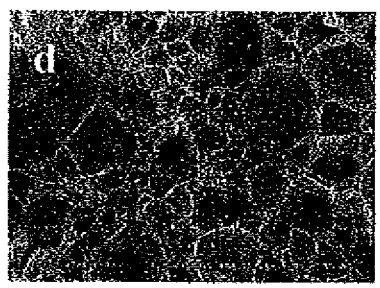
FIG. 4d is a scanning electron microscope (SEM) image of the foam morphology of microscopic beads containing nanoclay (0.5 wt. % nanoclay, 10% $H_2O$) expanded with an oil bath (135° C., 1 min.)

The distribution of water in the compact beads is shown in FIGS. 3a and 3b. FIG. 3a illustrates the polystyrene beads without $Na^+$MMT and FIG. 3b illustrates the polystyrene beads with $Na^+$MMT. Due to the constant AOT/emulsified water ratio for both the water contained polystyrene beads without and without $Na^+$MMT, similar domain size and size distribution were obtained. Most water droplets exhibited a size of 5 μm, with several larger droplets of approximately 10 μm. It was determined that with the incorporation of nanoclay ($Na^+$MMT), the shape of the emulsified water in the beads was more regular compared to those beads that did not contain nanoclay. The uniform dispersion of water droplets leads to a uniform or substantially uniform foam morphology in the final foam products.

The foam structures of the expanded polystyrene beads both with and without $Na^+$MMT are shown in FIG. 4. FIGS. 4a and 4c illustrate foams prepared by heating the polystyrene beads over an air gun and FIGS. 4b and 4c illustrate foams prepared by heating the polystyrene beads with a hot oil bath. The results are set forth in Table 1. It was determined that a higher expansion ratio of the foam was achieved by heating the polystyrene beads in a hot oil bath. The effect of the modifier-free nanoclay ($Na^+$MMT) on the expansion and thus the final foam structures can also be seen in FIG. 4.

TABLE 1

Expansion Ratios of Polystyrene Beads With and Without $Na^+$MMT

| Expansion ratio (α) | Polystryrene Beads Without $Na^+$MMT 10% $H_2O$ | Polystyrene Beads 0.5% $Na^+$MMT 10% $H_2O$ |
|---|---|---|
| Hot Air gun (135° C., 1 min) | 2.2 | 3.2 |
| Hot Oil Bath (135° C., 1 min) | 2.95 | 6.1 |

For polystyrene beads containing emulsified water (i.e., beads without $Na^+$MMT), the average expansion ratio was 2.2 when a hot air gun was used to prepare the foam whereas the expansion ratio was 2.95 when the foam was prepared using a hot oil bath. For the polystyrene beads containing the water/nanoclay droplets, the increase in the expansion ratio due to the placement in a hot oil bath is more apparent. As shown in Table 1, compacted beads containing $Na^+$MMT expanded nearly 90% more by the oil bath (6.1) then by hot air (3.2). It is believed that the reason for this difference in expansion may be the different diffusion rate of water in air and in oil. Once exposed to a hot medium (air/oil), a large concentration difference of water inside and outside the beads may lead to the diffusion of water out of the beads, rather than expansion. However, the diffusion rate of water is much slower in the oil. Therefore, more water can be trapped inside the beads and thus result in expansion during the oil heating.

As shown in Table 1, beads containing $Na^+$MMT exhibited higher expansion ratios upon heating than beads that did not contain nanoclay. For example, when heated with hot air, the incorporation of 0.5 wt. % nanoclay (based on styrene/polystyrene) lead to an increase of the expansion ratio from 2.2 to 3.2. When beads containing $Na^+$MMT were heated by the hot oil bath, the increase of expansion ratio associated with the nanoclay was more than 100% (i.e., 2.95 vs. 6.1). Before expansion, most of the clay exists in the emulsified water phase (reference numeral 90 in FIGS. 2a and 2b). During expansion, the nanoclay particles can be pushed against the cell wall of the foam, forming a barrier layer around the cell, which may diminish the loss of water via diffusion. As a result of the trapped water vapor, a higher expansion ratio may be achieved. It is to be noted that with the addition of clay, bimodal foam morphology is achieved (see, FIG. 4d), both with cells of 10 μm and cells of 100 μm.

Figure 5A:
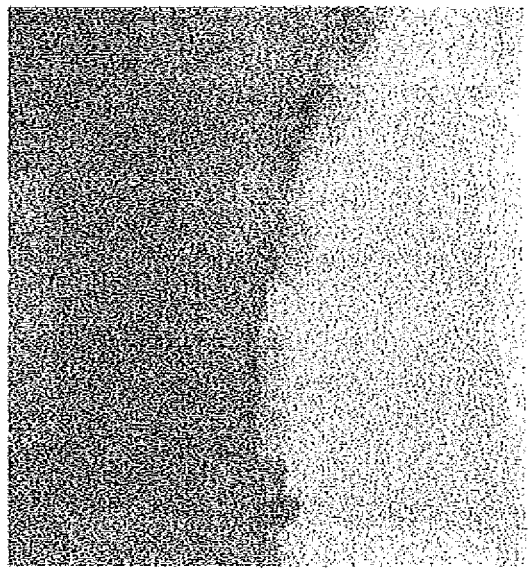
FIGS. 5a and 5b are transmission electron microscope images (TEM) of water contained polystyrene nanoclay composites.
Figure 5B:
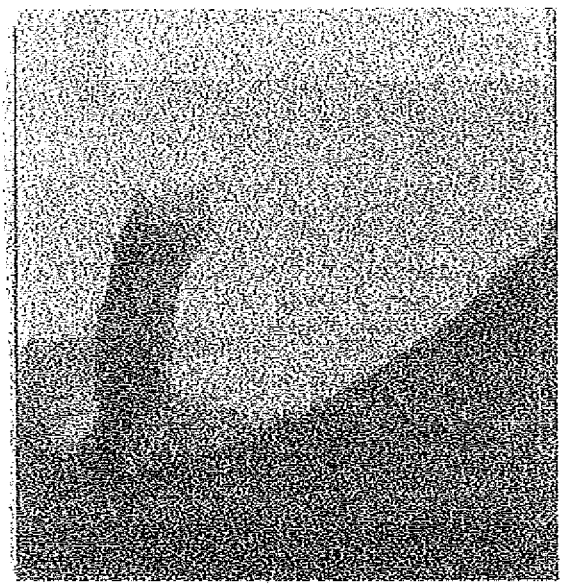

In addition, transmission electron microscopy (TEM) was used to characterize the nanoclay morphology in water/polymer phase. FIG. 5a depicts layers of MMT along the cell wall of the foam. FIG. 5b, a higher magnification (×180 K) of the TEM image of FIG. 5a shows good exfoliation of the clay layers for the polystyrene beads. The exfoliated layers of the clay result in an enhancement of the physical properties of nano-polymer composites, such as gas barrier, mechanical strength, and tensile and flexural modulus.

Example 2

Extrusion of Polystyrene Foams by Pre-Compounded Water/$Na^+$MMT with or without a Superaborbent Table 2 summarizes the experimental trials of four samples, A, B, C, and D. Sample A was a control sample, and contained no Na+MMT, polystyrene, or process aids. Process aids, such as Emkarate, a low molecular weight diester available from Alco Chemical, were used in Samples B-D to improve the appearance and to control the cell structure of the extruded foam. Compounds B and C were prepared by using a Leistritz twin-screw extruder and then pelletized. Sample D was extruded in the same twin-screw extruder as Samples B and C but with 4% carbon dioxide as a foaming blowing agent. The extruder die temperature was approximately 120° C. and the die pressure was approximately 1350 psi.

TABLE 2

Extrusion Foaming Components

| Sample | Polystyrene[a] (%) | Na+MMT (%) | Process Aid[b] (%) |
|---|---|---|---|
| A | 100 | Control sample | 0 |
| B | 85 | 5 | 10 |
| C | 85 | 10 | 5 |
| D | 97 | 2 (with half amount of water) | 1 |

[a]NOVA NC0038 (a high melt index polystyrene)
[b]EMKARATE 1090 (a low molecular weight diester available from ALCO Chemical)

To reduce the surfactant usage on the nanoclay surface and to simultaneously obtain a good intercalation or exfoliation structure, untreated Na+MMT nanoclay was dispersed into water in a weight concentration range from 0.25-75%, preferably in a weight concentration from 1-30%, and most preferably in a weight concentration range of from 3-8%. The resulting clay/water paste was then compounded into polystyrene by melt compounding.

Figure 6:
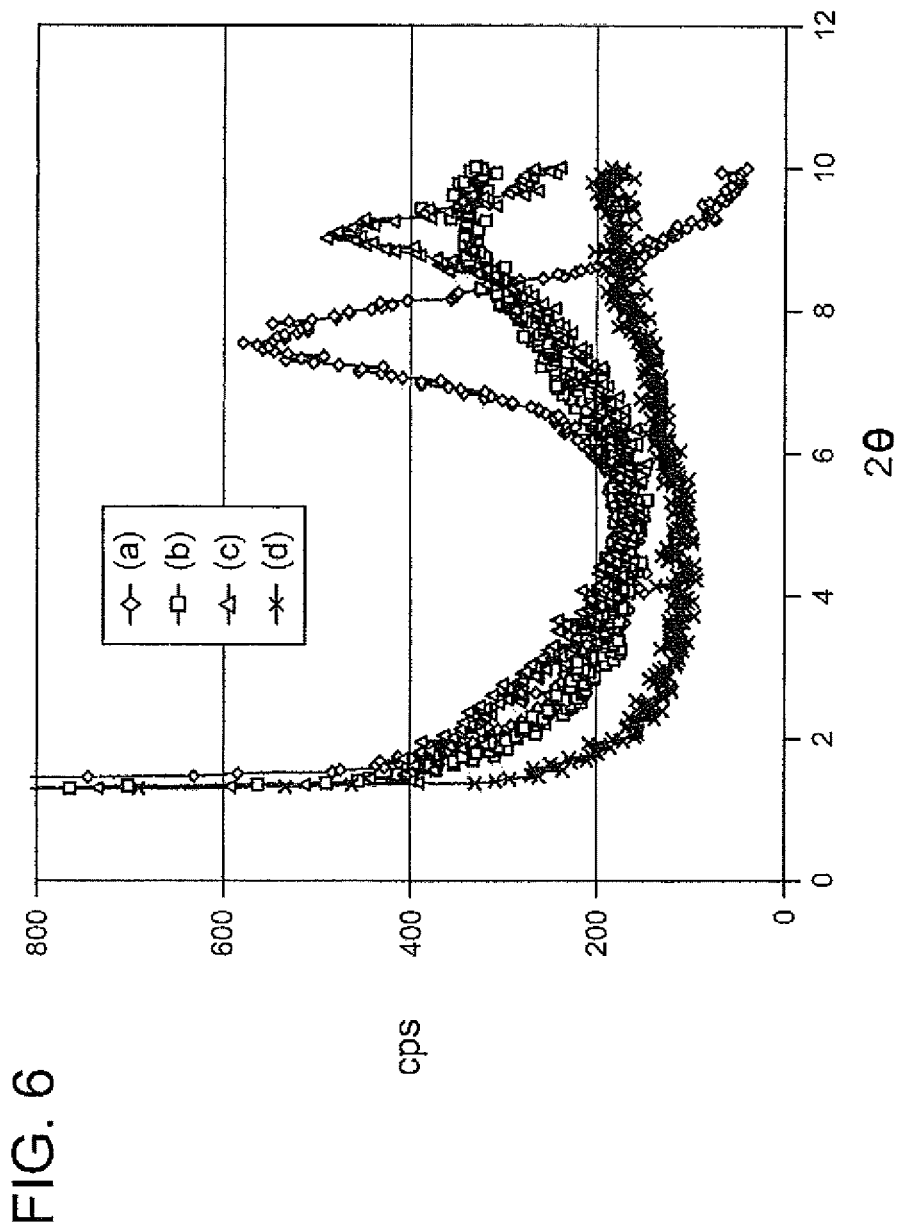
FIG. 6 is an x-ray diffraction (XRD) pattern of polystyrene/$Na^+MMT$ composites.

FIG. 6 depicts the X-Ray diffraction (XRD) patterns for Samples A-D set forth in Table 2. It was determined that because peaks were observed with Samples B and C, which have 5% and 10% Na+MMT clay respectively, without water dispersing, clay layer intercalation was not obtained. Sample D, which was pre-dispersed Na+MMT with water, exhibited no peak on the XRD curve, which indicated possible exfoliation.

Example 3

Fire Performance Testing

Fire performance tests (e.g., fire resistance) on foamed insulation with modified nanoclays and with modifier-free nanoclays as shown in Table 3 were conducted according to ASTM (oxygen index) and UL (Underwriters Laboratories in Northbrook, Ill.) small scale horizontal fire test methodology. The apparatus utilized to conduct the experimentation included a 3/8" ferrule laboratory Bunsen burner, two ring stands with adjustable clamps, and a 4 inch×8½ inch hardware cloth (three mesh with 8/64" stainless steel wire) with ½" length bent upwards at 90 degree angle. The sample size utilized for testing was 2"×6" and ½" in thickness. To pass the UL small fire test for polystyrene foams, the duration of burning of the specimen should be less than 20 seconds, and the flame spread should extend less than 60 mm. In addition, the oxygen index for insulation required from ASTM C578 has a minimum of 24% in volume.

Na+MMT without modifier and Na+MMT with Closite, a methyl tallow bis-2-hydroxyethyl quaternary ammonia salt modifier commercially available from Southern Clay Products, Inc. were dispersed in water with mechanical stirring. Both the modifier-free Na+MMT and the modified Na+MMT were extruded into foam boards with 1 wt % of microencapsulated hexabromocyclododecane (HBCD) fire retardant using carbon dioxide as a blowing agent, such as described in copending U.S. Patent Publication No. 2004/0051191 to Loh, et al., which is expressly incorporated by reference it its entirety. As described in U.S. Patent Publication No. 204/0051191, flame retardants such as HBCD, ethylene bis(pentabromodiphenyl), chloronaphthalene, perchloropentadecane, and/or functional additives (e.g., smoke suppressants, infrared attenuation agents, and the like) can be incorporated as a core material into a microcapsule. The primary shell material is typically includes one or more polymeric materials such as melamine formaldehyde, polyurethane, polyester, polyethylene, polypropylene, polystyrene, and the like.

Two group of the insulation samples were tested: one sample group containing Na+MMT polymer composite foam boards without a modifier (Samples 1-3) and one sample group containing Na+MMT polymer composite foam boards with a modifier (Samples 4-6). A summary of the test results are shown in Table 3.

TABLE 3

Summary of Oxygen and Small Scale Fire Testing

| | Small Scale Fire Test | | | Oxygen |
|---|---|---|---|---|
| | Time (sec) | Flame Spread (mm) | Drip | Index (%) |
| Without modifier | | | | |
| Sample 1 (with 1% Na+MMT) | 19 | 38 | Flame drip | 24 |
| Sample 2 (with 3% Na+MMT) | 14 | 33 | Partial drip | 25 |
| Sample 3 (with 5% Na+MMT) | 15 | 34 | No drip | 24 |
| With modifier | | | | |
| Sample 4 (Na+MMT with 1% Closite[a] 20 A) | 30 | 47 | Flame drip | 22 |
| Sample 5 (Na+MMT with 3% Closite 20 A) | >60 | 85 | Partial drip | 17 |
| Sample 6 (Na+MMT with 5% Closite 20 A) | >60 | >100 | No drip | 18 |

[a]Closite 20 A is a methyl tallow bis-2-hydroxyethyl quaternary ammonia salt modifier commercially available from Southern Clay Products, Inc.

The polystyrene/nanoclay compounds containing modifiers all burned vigorously even with the presence of the 1% hexabromocyclododecane (HBCD) fire retardant, and failed to pass the UL small scale fire test and oxygen index as required by ASTM C578. In contrast, the modifier-free polystyrene/nanoclay composites containing 1% HBCD fire retardant demonstrated fire extinction consistent with the standard product without nanoclay, and passed both the small scale fire test and the oxygen index (%) ASTM C578 standard. Both of the Na+MMT polymer composite foam boards (with and without modifier) demonstrated char forming during burning. This char formation clearly demonstrates that nanoclay changes the burning characteristics of extruded polystyrene foams from the conventional thermoplastic melt dripping to the solid char formation of the nanoclay extruded foams. Foam boards having a weight percentage of greater than 3 weight percent of the Na+MMT (Samples 3 and 6) were drip-free. It was also demonstrated that the elimination of the organic modifier typically used to improve processability (e.g., Closite 20A), improved greatly reduced flame extension, which assists in maintaining the flames in a limited area.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. Expandable polystyrene beads used to form foamed insulation products comprising:
    a polystyrene matrix; and
    particles positioned within said polystyrene matrix, wherein the particles each comprise an inverse emulsified water phase and modifier-free nanoclay substantially uniformly dispersed in the inverse emulsified water phase;
    wherein the expandable polystyrene beads exhibit an increase of expansion ratio when foamed of more than 100% in comparison with polystyrene beads lacking the substantially uniform distribution of modifier-free nanoclay,
    wherein the modifier-free nanoclay is sodium montmorillonite.

2. The expandable polystyrene beads according to claim 1, wherein said polystyrene matrix is spherical in shape and has a diameter from about 0.01 to about 5 mm.

3. The expandable polystyrene beads according to claim 1, wherein the modifier-free nanoclay is substantially exfoliated.

4. The expandable polystyrene beads according to claim 1, wherein the beads include about 1-15% by weight of the modifier-free nanoclay.

5. The expandable polystyrene beads according to claim 1, wherein a polymer foam prepared by expanding the polymer beads exhibits bimodal foam morphology.

6. The expandable polystyrene beads according to claim 1, wherein a polystyrene foam prepared by expanding the polystyrene beads exhibits improved fire resistance compared to a polystyrene foam prepared from expandable polystyrene beads including nanoclay and a modifier.

7. Expandable polystyrene beads used to form foamed insulation products comprising:
    a polystyrene matrix; and
    particles positioned within said polystyrene matrix, wherein the particles each comprise a water phase and modifier-free nanoclay;
    wherein the expandable polystyrene beads exhibit an increase of expansion ratio when foamed of more than 100% in comparison with polystyrene beads lacking the modifier-free nanoclay,
    wherein the modifier-free nanoclay is sodium montmorillonite.

* * * * *